3,317,043
IN-LINE FILTER CONSTRUCTION
Albert G. H. Vanderpoel, 14509 Van Ness Ave., Gardena, Calif. 90249
Filed Mar. 31, 1965, Ser. No. 444,338
7 Claims. (Cl. 210—94)

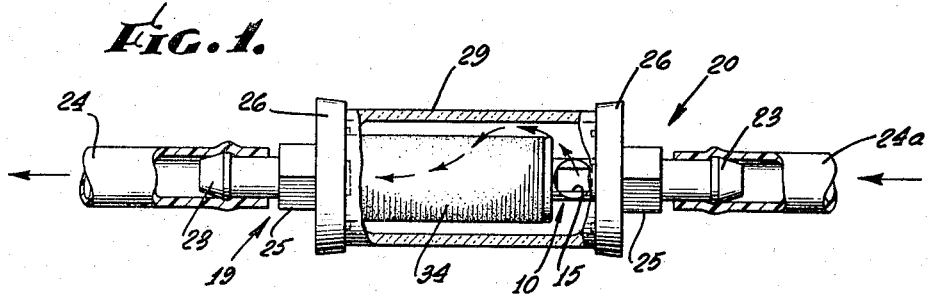
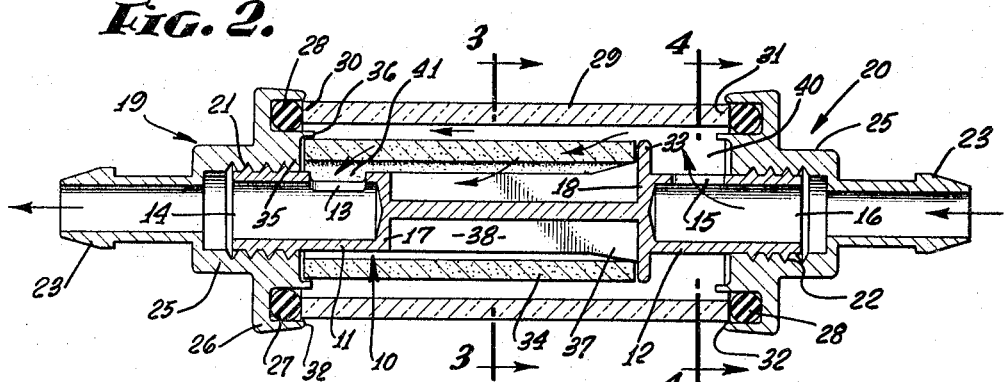
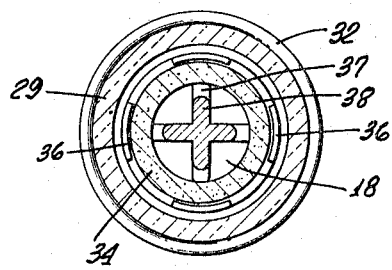
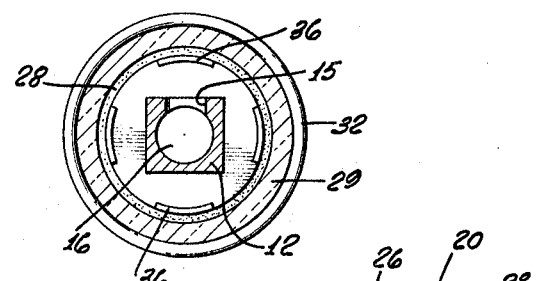
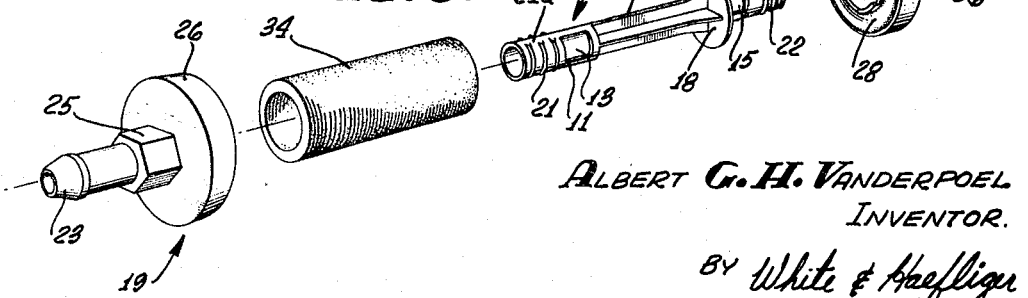

This invention relates generally to fuel filters, and more particularly concerns gasoline filters.

It is a major object of the invention to provide a fuel filter having a number of advantages which, in different sub-combinations and in total combination provide for unusually effective filter installation, operation and serving. Basically, the filter comprises an elongated body having tubular opposite end portions each with side and end openings, end caps mounted on the body end portions, a porous tubular filter element through which the body projects, and the body having or carrying a closure to close one end of the filter element so that the element is retained between the closure and one of the end caps which closes the opposite end of the body, one body portion side opening then having direct communication with the outside of the filter element and the other body portion side opening then having direct communication with the inside of the filter element, and finally a casing having opposite ends retained at the end caps and within which the body projects. As a result, fuel flow may be directed to enter the outside of the filter so that impurities in the fuel can be observed through the case, typically transparent, for periodic servicing, and also the unit may be quickly disassembled for cleaning, providing for low cost maintenance.

Other objects and advantages include the provision of O-ring seals carried by the end caps, with the casing opposite ends having annual sealing engagement with the seals, thereby to compensate for material expansion and contraction, the provision of at least one end cap with threaded connection to the body tubular end portion on which the cap is mounted, so that the threaded cap may be advanced on the body to control the clamping of the casing end portions and O-rings; the equipping of at least one end cap with a shoulder to locate the filter element in centered relation to the body axis giving perfect end sealing of the filter element; the provision of like end caps both having threaded connection with the body, and both being tubular and having hose nipples at their terminals remote from the casing opposite ends; and the provision of polygonal shoulders on the end caps to the wrench gripped for rotating the end caps on the body.

These and other objects and advantages of the invention, as well as the details of illustrative embodiments, will be more fully understood from the following detailed description of the drawings in which:

FIG. 1 is a side elevation of the filter, partly broken away;

FIG. 2 is a view like FIG. 1, but enlarged and taken in section;

FIGS. 3 and 4 are enlarged cross sections taken on lines 3—3 and 4—4 of FIG. 2; and FIG. 5 is an axially exploded view of the filter taken in perspective.

The illustrated liquid fuel filter comprises an elongated body 10 having tubular opposite end portions 11 and 12, the former having side and end openings 13 and 14, and the latter also having side and end openings 15 and 16. The portions 11 and 12 are closed by internal end walls 17 and 18.

Like end caps 19 and 20 are mounted on the body end portions 11 and 12, and typically by means of threading 21 and 22. Further, each end cap may include a hose nipple 23 for connection to a hose such as at 24 and 24a, polygonal shoulders 25 to be wrench gripped, and a flange 26 grooved at 27 to receive a sealing O-ring 28, typically made of rubber or an elastomer. A casing 29 has opposite ends 30 and 31 in annular sealing engagement with the O-ring seals, the clamping or sealing force being controlled by relatively advancing or retracting one or both end caps, as afforded by turning the end cap by means of a wrench applied to shoulders 25. The casing 29 is typically made of high-impact transparent plastic material, and the ends thereof are centered by the shoulder 32 at the grooving 27.

Body 10 has a closure 33 thereon to close one end of a porous tubular filter element 34 through which the body projects, the closure typically taking the form of a flange integral with the metallic body. The element 34 is endwise retained between the closure and one of the end caps closing off the opposite end of the filter element at 35. In this regard, the end cap has shoulders at 36 for locating the corresponding end of the filter element in coaxial alignment with the axis of body 10. Also, the body itself has a shoulder, as for example is provided by the end tapers 37 on body flutes 38, to locate the associated end of the filter element in coaxial alignment with the axis of body 10. As a result, the opposite ends of the filter are mechanically sealed off or closed, so that all liquid passing through the filter element must pass through the porous tubular wall thereof.

In this regard, fuel flows through body end portion 12 and its side opening 15 into the space 40 at the outside of the filter element; the fuel then flows radially through the element and into the space 41 at the inside thereof, to exit via body side and end openings 13 and 14. Accordingly, impurities in the fuel can be observed in space 40 through the case 29, and the user can readily see when it is necessary to disassemble the filter and clean same. The filter element itself may be made of any suitable porous, filtering material. One highly advantageous material is identified by the trademark Microbon, and is supplied by the Bendix Corporation.

Additional advantages displayed by the invention include the provision of filter end caps grooved to retain O-rings to seal off regardless of fuel contact expansion of the rings, the rings also being retained during disassembly of the filter for servicing; the provision of a filter with flanged end caps to locate and protect the outside casing 29; and the use of flanged end caps to center the filter element and casing simultaneously. Also, the coarse threading 21 and 22 is preferably cut away as at 21a and 22a in FIG. 5 to permit rocking of the end caps for adjustable centering of the filter element and casing, and to permit some fuel flow between the body 10 and the end caps for increased capacity. Finally, the end nipples 23 are enlarged to accommodate larger sized tubing.

I claim:

1. A liquid fuel filter, comprising an elongated body having tubular opposite end portions each with side and end openings, and caps mounted on said body end portions, a porous tubular filter element through which the body projects, the body having a closure thereon to close one end of said filter element so that the element is retained between said closure and one of said end caps closing the opposite end of said element, one body portion side opening then having direct communication with the outside of said filter element and the other body portion side opening then having direct communication with the inside of said filter element, and a casing having opposite ends retained at said end caps and within which said body projects.

2. A filter as defined in claim 1 including O-ring seals carried by said end caps, the casing opposite ends having annular sealing engagement with said seals.

3. A filter as defined in claim 2 in which at least one end cap has threaded connection with the body tubular end portion on which said one cap is mounted, whereby said one cap may be relatively advanced on the body to control the clamping of said casing end portions and O-rings.

4. A filter as defined in claim 1 in which said body has an axis, and said body and one end cap have shoulders locating said filter element in coaxial alignment with said body axis.

5. A filter as defined in claim 1 in which said end caps are alike, both having threaded connection with the body tubular end portions on which the caps are mounted, both end caps being tubular and having hose nipples at the terminals thereof remote from the casing opposite ends.

6. A filter as defined in claim 5 in which both end caps have external polygonal shoulders adapted to be wrench gripped for rotating the end caps on said body.

7. A filter as defined in claim 1 in which said casing is transparent so that the filter element be viewed.

References Cited by the Examiner
UNITED STATES PATENTS

| | | | |
|---|---|---|---|
| 1,638,066 | 8/1927 | Smythe | 210—94 X |
| 2,793,752 | 5/1957 | Jay | 210—448 X |
| 3,240,346 | 3/1966 | Callahan et al. | 210—448 |

SAMIH N. ZAHARNA, *Primary Examiner.*